United States Patent
West et al.

(10) Patent No.: US 11,228,844 B2
(45) Date of Patent: Jan. 18, 2022

(54) PUSH-PULL ELECTRET TRANSDUCER WITH CONTROLLED RESTORING FORCE FOR LOW FREQUENCY MICROPHONES AND ENERGY HARVESTING

(71) Applicants: THE JOHNS HOPKINS UNIVERSITY, Baltimore, MD (US); TECHNISCHE UNIVERSITÄT DARMSTADT, Darmstadt (DE)

(72) Inventors: James E. West, Baltimore, MD (US); Kailang Ren, Baltimore, MD (US); Adebayo Eisape, Baltimore, MD (US); Gerhard Sessler, Darmstadt (DE); Ugur Erturun, Baltimore, MD (US)

(73) Assignee: THE JOHNS HOPKINS UNIVERSITY, Baltimore, MD (US)

( * ) Notice: Subject to any disclaimer, the term of this patent is extended or adjusted under 35 U.S.C. 154(b) by 0 days.

(21) Appl. No.: 16/614,086

(22) PCT Filed: May 18, 2018

(86) PCT No.: PCT/US2018/033507
§ 371 (c)(1),
(2) Date: Nov. 15, 2019

(87) PCT Pub. No.: WO2018/213781
PCT Pub. Date: Nov. 22, 2018

(65) Prior Publication Data
US 2020/0178001 A1    Jun. 4, 2020

Related U.S. Application Data

(60) Provisional application No. 62/508,177, filed on May 18, 2017.

(51) Int. Cl.
*H04R 19/01*    (2006.01)
*H04R 19/04*    (2006.01)
(Continued)

(52) U.S. Cl.
CPC ............. *H04R 19/016* (2013.01); *H02N 1/08* (2013.01); *H04R 7/04* (2013.01); *H04R 19/04* (2013.01);
(Continued)

(58) Field of Classification Search
CPC .................................................... H04R 19/016
See application file for complete search history.

(56) References Cited

U.S. PATENT DOCUMENTS 3,370,212 A    2/1968    Frank
3,896,274 A    7/1975    Fraim
(Continued)

FOREIGN PATENT DOCUMENTS

CN    204681593 U    9/2015
DE       2330800 A1    1/1975
(Continued)

OTHER PUBLICATIONS

Wikipedia, Fluorinated ethylene propylene, published May 2016, https://web.archive.org/web/20160506180205/https://en.wikipedia.org/wiki/Fluorinated_ethylene_propylene (Year: 2016).*
(Continued)

*Primary Examiner* — Mark Fischer
(74) *Attorney, Agent, or Firm* — MH2 Technology Law Group LLP

(57) ABSTRACT

Provided is an energy harvesting system, including: a first electrode; a second electrode; a non-metalized mono-charged electret diaphragm disposed between the first and second electrodes; a base; a spring extending between the base and the electret diaphragm; and a rod in communication with the electret diaphragm and for manipulating a position of the electret diaphragm relative to the first and second electrodes.

14 Claims, 4 Drawing Sheets

(51) Int. Cl.
*H04R 31/00* (2006.01)
*H04R 7/04* (2006.01)
*H02N 1/08* (2006.01)

(52) U.S. Cl.
CPC ..... *H04R 31/003* (2013.01); *H04R 2307/025* (2013.01)

(56) References Cited

U.S. PATENT DOCUMENTS

| | | | |
|---|---|---|---|
| 4,041,446 | A | 8/1977 | Liebermann |
| 6,243,474 | B1 | 6/2001 | Tai |
| 6,391,118 | B2 | 5/2002 | Fujii et al. |
| 2008/0123876 | A1* | 5/2008 | Sato ............ H04R 19/016 381/174 |
| 2009/0245547 | A1 | 10/2009 | Lee et al. |
| 2010/0175477 | A1 | 7/2010 | Kasai et al. |
| 2012/0002826 | A1 | 1/2012 | Wu |
| 2012/0074815 | A1 | 3/2012 | Jean-Mistral |
| 2013/0044899 | A1 | 2/2013 | Barber et al. |

FOREIGN PATENT DOCUMENTS

| | | |
|---|---|---|
| EP | 2182737 A1 | 5/2010 |
| EP | 2369855 | 9/2011 |
| JP | 2004222091 A | 8/2004 |
| WO | 2002048659 | 6/2002 |

OTHER PUBLICATIONS

PCT International Preliminary Report on Patentability dated Nov. 28, 2018 in corresponding International Application No. PCT/US2018/033507.

Dessein, "Modelling distortion in condenser microphones", Technical University of Denmark DTU, Jun. 2009, 92 pages.

Van Turnhout, "The Use of Polymers for Electrets", Journal of Electrostatics, 1 (1975), Elsevier Scientific Publishing Company, Amsterdam, 17 pages.

Sessler, "Electret transducers: a review", The Journal of the Acoustical Society of America, vol. 53, No. 6, 1973, 13 pages.

Hillenbrand et al., "Electret accelerometers: Physics and dynamic characterization", The Journal of the Acoustical Society of America, vol. 129, 2011, 9 pages.

Meninger et al., "Vibration-to-Electric Energy Conversion", IEEE Transactions on Very Large Scale Integration (VLSI) Systems, vol. 9, No. 1, Feb. 2001, 13 pages.

Sessler et al., "Topics in Applied Physics: Electrets", Springer-Verlag Berlin Heidelberg 1980 and 1987, 20 pages.

Bai et al., "Experimental modeling and design optimization of push-pull electret loudspeakers", The Journal of the Acoustical Society of America, vol. 127, Feb. 3, 2010, 9 pages.

Chen et al., "A Thin Light Flexible Electromechanically Actuated Electret-Based Loudspeaker for Automotive Applications", IEEE Transactions on Industrial Electronics, vol. 59, No. 11, Nov. 2012, 8 pages.

Giacometti et al., "Corona Charging of Polymers" IEEE Transactions on Electrical Insulation, vol. 27, No. 5, Oct. 1992, 20 pages.

Hoffmann et al., "Fabrication, characterization and modelling of electrostatic micro-generators", Journal of Micromechanics and Microengineering, vol. 19, Aug. 26, 2009, 12 pages.

Karagozler et al.,"Paper Generators: Harvesting Energy from Touching, Rubbing and Sliding", UIST'13, Oct. 8-11, 2013, ST. Andrews, UK, 8 pages.

Mellow et al., "On the forces in single-ended and push-pull electret transducers", The Journal of the Acoustical Society of America, vol. 124, 2008, 9 pages.

Okamoto et al., "A Concept of an Electret Power Generator Integrated With a Rectifier", PowerMEMS 2009, Dec. 1-4, 2009, Washington DC, USA, 4 pages.

* cited by examiner

PUSH-PULL ELECTRET TRANSDUCER WITH CONTROLLED RESTORING FORCE FOR LOW FREQUENCY MICROPHONES AND ENERGY HARVESTING

CROSS-REFERENCE TO RELATED APPLICATIONS

This application is a national stage conversion under 35 U.S.C. § 371 of PCT Application No. PCT/US2018/033507 entitled "PUSH-PULL ELECTRET TRANSDUCER WITH CONTROLLED RESTORING FORCE FOR LOW FREQUENCY MICROPHONES AND ENERGY HARVESTING" filed May 18, 2018, which claims priority to U.S. Provisional Patent Application Ser. No. 62/508,177, filed May 18, 2017, the entire disclosures of which are incorporated herein by reference.

FIELD

This disclosure is generally directed to the field of electret transducers for use as low frequency microphones and in energy harvesting applications.

BACKGROUND

The use of stored charge rather than piezoelectricity has gained substantial interest in small electronic devices. These devices generate power in the micro-watt range due to their small size and limited range of diaphragm motion. One might treat these devices as an electret microphone from the operation standpoint to determine the power generation ability. While these systems can be scaled up in size, the output power is still limited by the amount of movement of the device's diaphragm, and the charge level. Large area space-charge generators can produce average peak power terminated with one Meg Ohm resistor of up to 44 mW.

What is needed in the art, therefore, is an improved energy device that overcomes the limitations of low output power of prior art energy devices.

SUMMARY

In an embodiment, there is a push-pull electret transducer, comprising: a first electrode; a second electrode; and a non-metalized mono-charged electret diaphragm disposed between the first and second electrodes.

In an embodiment, there is a method of making a push-pull electret transducer, comprising: providing a first metal electrode; providing a fluoropolymer film over the first metal electrode; and introducing a negative charge into the fluoropolymer film.

In an embodiment, there is an energy harvesting system, comprising: a first electrode; a second electrode; a non-metalized mono-charged electret diaphragm disposed between the first and second electrodes; a base; a spring extending between the base and the electret diaphragm; and a rod in communication with the electret diaphragm and for manipulating a position of the electret diaphragm relative to the first and second electrodes.

In an embodiment, there is a single ended sensor, comprising: a base; a diaphragm; at least one spring extending from the base to the diaphragm; a metal backplate disposed between the base and the diaphragm; and an electret disposed between the metal backplate and the diaphragm.

In an embodiment, there is a mono-charged push-pull (PP) electret transducer comprising a spring for supporting a diaphragm, wherein the spring comprises a restoring force spring constant and wherein a resonance frequency of the transducer and a static pressure operating range of the transducer are pre-determined via adjusting the spring's restoring force spring constant. In an embodiment, the diaphragm comprises an electret diaphragm and a static position thereof is balanced between two electrodes for the push-pull arrangement configured as a microphone. In an embodiment, there is a microphone with variable restoring force. The microphone can have sensitivity in the 10-100 mV/Pa range, for example, depending on resonance frequency and electret charge level (e.g., charge density).

Advantages of at least one embodiment include an asymmetric static position of the mono-charged diaphragm. An advantage of at least one embodiment includes an improved output voltage for energy generation, such as, for example, up to 90% of the polarization voltage for centimeter range of the diaphragm motion.

Additional advantages of the embodiments will be set forth in part in the description which follows, and in part will be understood from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

DETAILED DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

The following embodiments are described for illustrative purposes only with reference to the Figures. Those of skill in the art will appreciate that the following description is exemplary in nature, and that various modifications to the parameters set forth herein could be made without departing from the scope of the present invention. It is intended that the specification and examples be considered as examples only. The various embodiments are not necessarily mutually exclusive, as some embodiments can be combined with one or more other embodiments to form new embodiments.

Push-pull electret transducers have attracted a great deal of scientific attention as headphones and high frequency loudspeakers. Push-pull headphones have been on the market since the late 1990s. The basic principle is explained in the following; a diaphragm of two electrets contacted with their metal layers is sandwiched in the middle between two metal plates, which consists of a symmetrical system. This system can be widely used in high frequency loud speakers and headphones with relative high efficiency.

Figure 1:
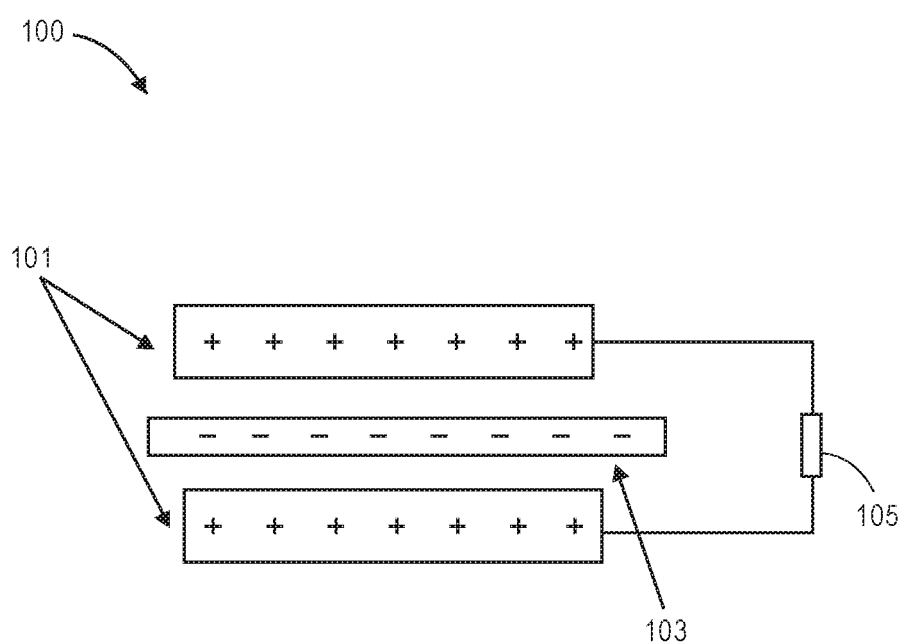
FIG. 1 is a schematic drawing of non-metalized mono-charge electret transducer.

A push-pull system 100 of an embodiment is comprised of two electrodes 101 connected to a circuit 105, such as a rectifying circuit, and a non-metalized polymer diaphragm 103 that has a mono-charge in the kV range and sandwiched between the two electrodes 101 as shown in FIG. 1. While not limited to any particular method, measurement of the mono-charge at 1.5 kV on 25 μm FEP has been found to be stable even at temperatures of 100° C. degree.

Figure 2:
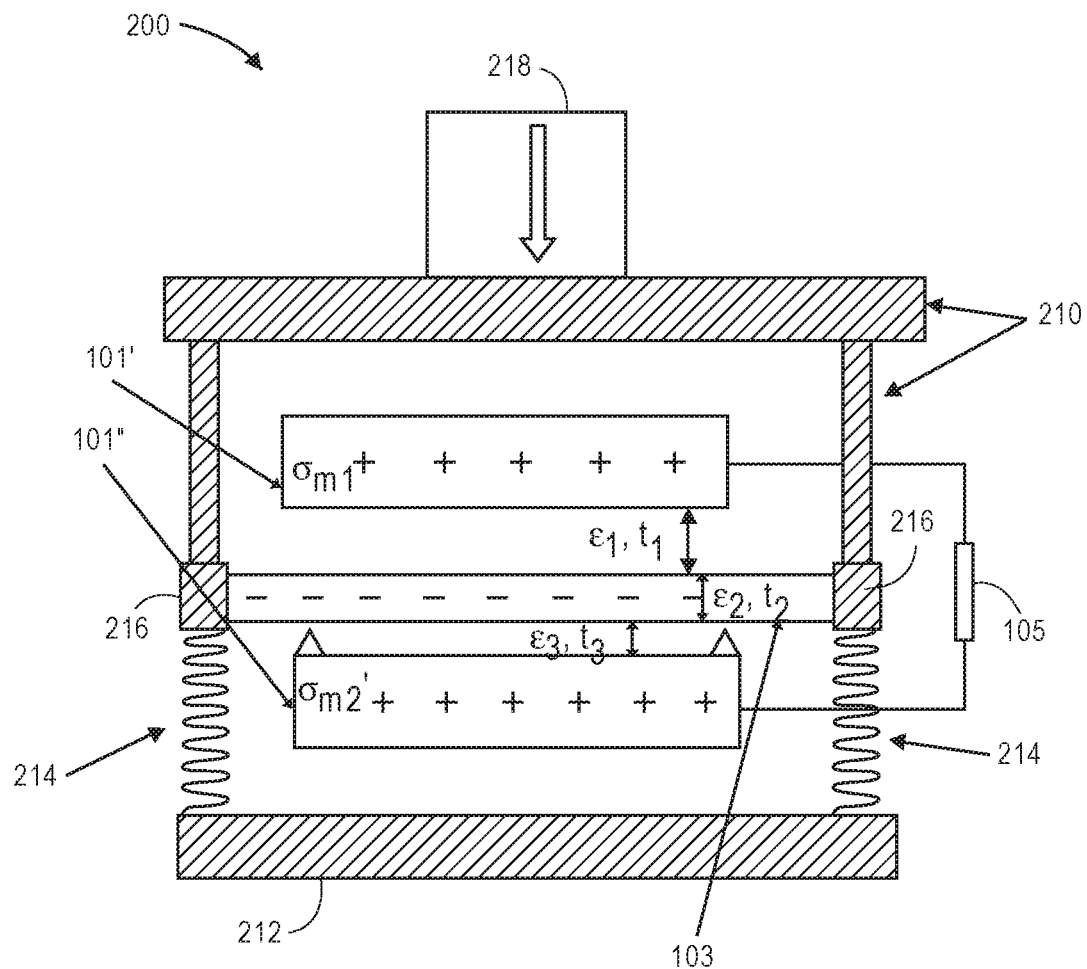
FIG. 2 is a graphical representation of an asymmetrical electret transducer with non-metalized mono-charge electret.

An asymmetrical electret transducer 200 according to an embodiment is shown in FIG. 2 and comprises a non-metalized mono-charged electret diaphragm 103 which may comprise a polymer as described above. The push-pull electret transducer comprises: a first electrode 101'; a second electrode 101"; and a non-metalized mono-charged electret diaphragm 103 disposed between the first and second electrodes. The push-pull electret transducer may further comprise at least one spring 214, wherein the at least one spring 214 contacts the electret diaphragm—e.g., the diaphragm 103 can be suspended between the first electrode 101' and second electrode 101" by the at least one spring 214. The push-pull electret transducer 200 may further comprise a supporting frame counterbalance 210, wherein the supporting frame counterbalance 210 contacts the electret diaphragm 103, for example, at attachment points 216 and wherein the at least one spring 214 opposes a force 218 applied against the electret diaphragm 103 by the frame counterbalance 210. In an embodiment, the electret diaphragm 103 is disposed between the supporting frame counterbalance 210 and the at least one spring 214. In an embodiment, a change in pressure on the supporting frame counterbalance causes the electret diaphragm 103 to move between the at least two electrodes 101' and 101". In an embodiment, movement of the electret diaphragm 103 results in a charge rearrangement on the two electrodes.

The diaphragm may comprise any suitable material. For example, in an embodiment, the diaphragm comprises a polymer. The polymer may be selected from a fluoropolymer. For example, the fluoropolymer may comprise fluorinated ethylene propylene (FEP) or polytetrafluoroethylene (PTFE).

As shown in FIG. 2, the diaphragm 103 comprises a non-metalized mono-charged electret diaphragm and is suspended between two electrodes 101' and 101" by at least one spring 214 that extends between base 212 and a supporting frame counterbalance 210 (e.g., a seismic mass). A change in pressure on the supporting frame counterbalance 210 causes the diaphragm 103 to move resulting in charge rearrangement on the two electrodes (plates) 101' and 101". When the restoring force equilibrant position is centered between the two plates 101' and 101", the output voltage (e.g., to rectifier circuit 105 connected to 101' and 101") is proportional to the force 218 on the counterbalance. Transducer 200 thus provides a linear system by which sound and vibration measurements can be performed. For energy generation, an asymmetrical equilibrant position is more efficient for transferring maximum charge between the two electrodes as shown in the figure (e.g., a gap of length $t_1$ between electrode 101' and diaphragm 103, such as a first surface of diaphragm 103, can be larger than a gap of length $t_3$ between electrode 101" and diaphragm 103, such as a second opposing surface of diaphragm 103, or vice-versa). This system is adaptable to both static and changing pressure levels by selecting the proper spring constants for the static pressure operating range, for example depth operating range in water can be predetermined. The mono-charge transducer 200 of the embodiments also makes it possible for a relatively large gap (e.g., of length $t_1$ and/or $t_2$) between electret and metal plate electrode(s) allowing maximum charge transfer to circuit 105. With this kind of transducers, electret-metal plate electrode spacing in the orders of a few cm is possible.

Accordingly, in an embodiment of a push-pull transducer 200 as described above, a static position of the electret diaphragm 103 is balanced between the two electrodes 101' and 101" such that push-pull electret transducer is configured as a microphone. As such, the at least one spring 214 can provide a variable restoring force to support the mono-charged electret diaphragm 103 between the first and second electrodes 101', 101". Accordingly, the push-pull electret transducer may be configured as a microphone for use in water. Additionally, the push-pull electret transducer 200 may have sensitivity in the range of from about 10 to 100 mV/Pa. Further, for the push-pull electret described above, wherein the mono-charged electret diaphragm 103 may have an asymmetric static position.

In an embodiment, there is a method for making a push-pull electret transducer. Generally, the method can include providing a first metal electrode; providing a fluoropolymer film over the first metal electrode; and introducing either a positive or a negative charge into the fluoropolymer film. A second metal electrode may be provided over the fluoropolymer film. In an example, the introducing of the negative charge is by electron bombardment. In an implementation of such a method, a plain FEP or PTFE Teflon film (no electrode) is tightly held in a designed circular metal frame. Before corona charge, two metal plates are prepared as the electrodes. The bottom metal plate and Teflon film are put together into a corona chamber. The needle voltage and grid voltage can be set at −10 kV and −2 kV, respectively. In the corona charge process, electron bombardment introduces negative charge into Teflon film by grid voltage of corona and consequently the compensated positive charges are generated at the bottom of metal plate. After the charging is complete, the top metal plate electrode is placed on top of the frame to prevent the decay of mono-charge in the air.

Figure 3:
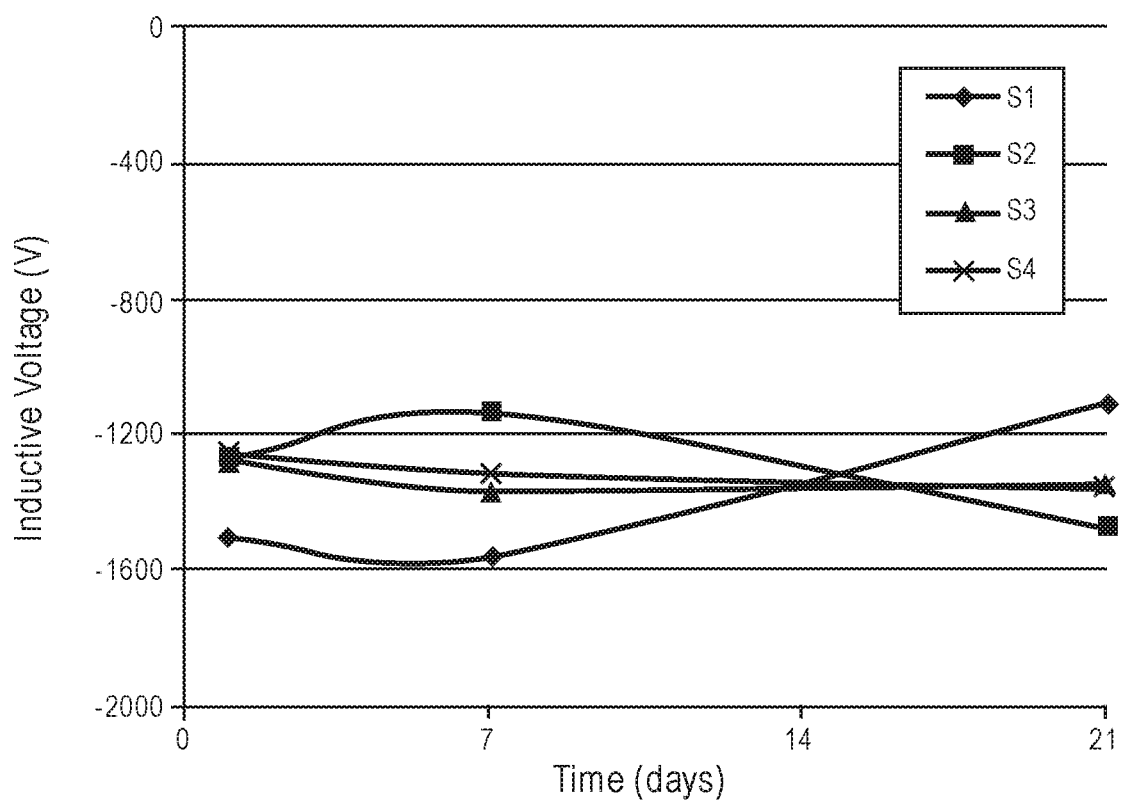
FIG. 3 is a graph showing retained induction charge on the top side of a FEP monocharge electret samples, as measured with an Isoprobe Electrostatic Voltmeter.

In an implementation of the method, sample push-pull monocharge electret systems S1-S4 were formed and a retained induction charge on the top side of FEP monocharge electret samples, as measured with an Isoprobe Electrostatic Voltmeter were plotted as function of time. Results are shown in the graph of FIG. 3. From the data, it is observed that the induction voltages on the samples are stably around −1200 V and shows no decay after three weeks.

A monocharge electret sample was also thermally treated in an oven at 100° C. for 72 hours, the induction voltage in the monocharge FEP electret sample did not deteriorate. The monocharge samples were found to be stable in the condition where the monocharge electret sample was kept in the middle of enclosed top and bottom metal electrodes with a distance around 1 cm. Thus, such push-pull monocharge electret systems according to embodiments described herein may be used for transducer and energy harvesting applications.

A push-pull transducer with a mono-charge electret may be adapted for use as an energy harvesting device, e.g., as a sensor, that can operate at any pre-determined static pressure. A resonant frequency of such a push-pull transducer can be below that of a normal electret microphone (about 10 kHz). Accordingly, for low frequencies, additional gain in sensitivity can be realized. In other words, according to an embodiment a push-pull transducer comprises a mono-charge electret in the center of two metal plate electrodes. An induction charge can, therefore, be generated at the top and bottom metal plate electrodes to balance the mono-charges. Following such an up and down movement of the mono-charge electret, the metal plate electrode closer to the mono-charge electret layer (e.g., a film) can generate more charges than opposite metal plates. A differential potential created by the transducers of the embodiments is largely dependent on the charge difference across two metal plates. If we collect these charges using a rectifier circuit, the voltage in the order of a few hundred volts is easily obtained for energy harvesting devices.

While not limited to any particular theory, it is believed that Gauss's law can be applied for the electric displacement of the interface between the mono-charge electret and metal plate electrode of a device of an embodiment, for example, that as shown in FIG. 2 and yielding:

$$\sigma_{m1} = \frac{\frac{t_2}{\varepsilon_2}\sigma_0 + \frac{t_3}{\varepsilon_3}\sigma_0}{\frac{t_1}{\varepsilon_1} + \frac{t_2}{\varepsilon_2} + \frac{t_3}{\varepsilon_3}}, \quad (\text{Eq. 1})$$

where $t_1$, $t_2$, $t_3$ are the gap between mono-charge electret diaphragm 103 and top metal electrode 101', the thickness of the mono-charge electret diaphragm 103, and the gap between mono-charge electret diaphragm 103 and bottom metal electrode 101", respectively; $\varepsilon_1$, $\varepsilon_2$ and $\varepsilon_3$ are dielectric constant at the gap between mono-charge electret diaphragm 103 and top metal electrode 101', of the mono-charge electret diaphragm 103, and the gap between mono-charge electret diaphragm 103 and bottom metal electrode 101", respectively; $\sigma_0$ is the charge density; and $\sigma_{m1}$ and $\sigma_{m2}$ are the induction charge mono-charge at top and bottom metal electrode plates 101' and 101", respectively.

Similarly, the induction charge at bottom metal plate will become:

$$\sigma_{m2} = \frac{\frac{t_2}{\varepsilon_2}\sigma_0 + \frac{t_1}{\varepsilon_1}\sigma_0}{\frac{t_1}{\varepsilon_1} + \frac{t_2}{\varepsilon_2} + \frac{t_3}{\varepsilon_3}}. \quad (\text{Eq. 2})$$

Accordingly, the induction charge can be estimated in two extreme cases. In case I, the monocharge electret is very close to top metal plate, such as $t_1$=0.5 mm, $t_2$=20 μm and $t_3$=3 mm. If we set the dielectric constant $\varepsilon_1=\varepsilon_3=1$; $\varepsilon_2=2$, the calculated $\sigma_{m1}$ and $\sigma_{m2}$ are $0.86\sigma_0$ and $0.14\sigma_0$, respectively. In case II, if the monocharge electret is very close to the bottom plate, such as $t_1$=3 mm, $t_2$=20 μm, $t_3$=0.5 mm, the calculated $\sigma_{m1}$ and $\sigma_{m2}$ are $0.14\sigma_0$ and $0.86\sigma_0$, respectively. From this calculation, it is known that following the movement of the mono-charge electret, the closer metal plate will generate more charges than opposite metal plates. Thus, for the application of energy harvesting using this push-pull system with mono-charge electret, the efficiency of the entire system is only dependent on the ratio of generated charge over the input mechanical energy in the system. Thus, various systems can be designed depending on specific application requirement.

Figure 4A:
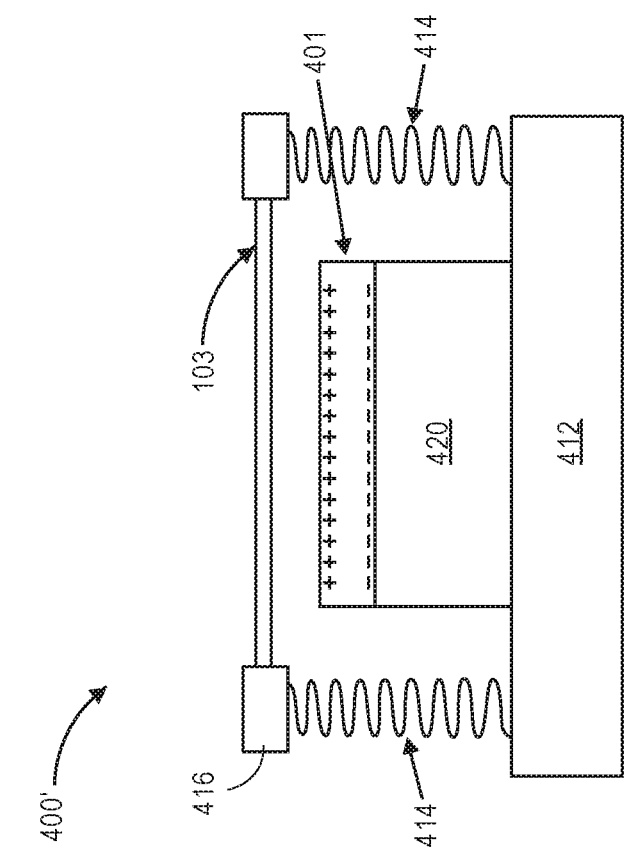
FIG. 4A is a schematic drawing of a pull-pull energy harvesting system using a monocharged electret according to an embodiment.

For example, a push pull energy harvesting system is shown in FIG. 4A. This system can be implemented in an enclosed chamber. Generally, the mono-charge electret may be supported with a metal frame which is supported by a spring at the bottom and includes a plastic rod on the top. When the plastic rod pushes up and down the electret frame, different amount of compensated charge will be generated at the top and bottom plates. A rectifier circuit can be used to collect the charge from two metal plates.

In other words, in an embodiment, for example, as shown in FIG. 4A, there is an energy harvesting system 400, comprising: a first electrode 101'; a second electrode 101'; a non-metalized mono-charged electret diaphragm 103 disposed between the first 101' and second 101" electrodes; a base 412; at least one spring 414 extending between the base 412 and the electret diaphragm 103; and a rod 411 in communication with the electret diaphragm and for manipulating a position of the electret diaphragm relative to the first and second electrodes. As described above, manipulation of the rod 411 generates an amount of compensated charge at the first electrode 101', the second electrode 101" or both the first 101' and the second 101" electrodes. In an implementation, the rectifier circuit (not shown) is electrically connected to the first electrode and the second electrode, wherein the rectifier circuit receives the charge generated at the first electrode, the second electrode or both the first and the second electrode. As described above, the energy harvesting system 400 can further comprise a supporting frame 410 for supporting the electret diaphragm 103, such as at attachment points 416, and a first end of the spring 414 contacts the base 412 and an opposing, second end of the spring 414 contacts the supporting frame 410. Additionally, the rod 411 comprises a first, moveable end and a second end connected to the supporting frame 410.

Figure 4B:
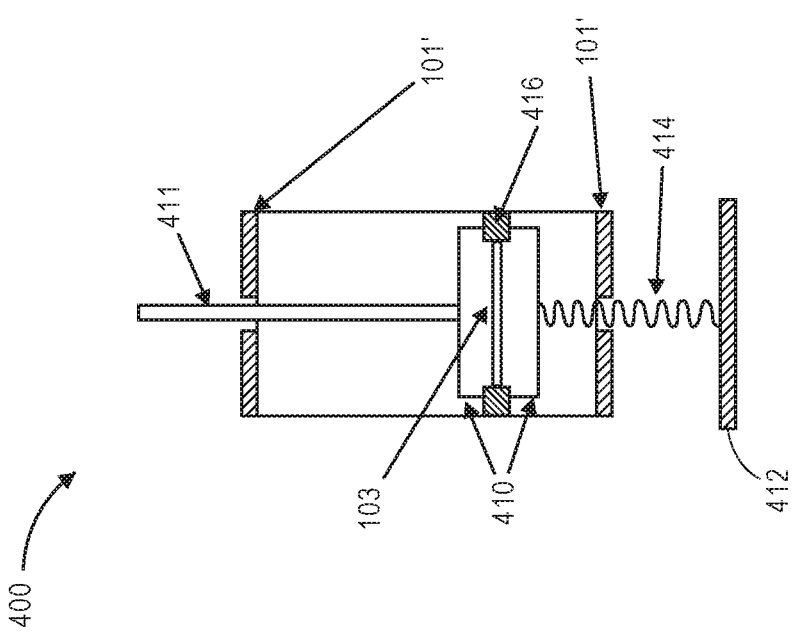
FIG. 4B is a schematic drawing of a microphone comprising an FEP electric according to an embodiment.

In another example, a transducer may be realized for use in deep ocean where it allows corresponding large electret film deformation in electrical field, then generate large amplitude acoustic signals. A single ended sensor with pre-determined static pressure range is shown in FIG. 4B. In this system, the electret is part of the backplate so that the choice of the diaphragm material can be more flexible. Accordingly, in yet another embodiment, there is a single ended sensor 400', comprising: a base 412; a diaphragm 103;

at least one spring 414 extending from the base to the diaphragm 103, for example, at attachment points 416; a metal backplate 420 disposed between the base 412 and the diaphragm 103; and an electret 401 disposed between the metal backplate 420 and the diaphragm 103. In an implementation, the electret 401 comprises part of the backplate 420. In an example, the electret 401 comprises a metalized FEP electret. Accordingly, such a single ended sensor 400' can have a pre-determined static pressure range.

While the present teachings have been illustrated with respect to one or more implementations, alterations and/or modifications may be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages may be added or existing structural components and/or processing stages may be removed or modified.

Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the illustrated embodiment.

Terms of relative position as used in this application are defined based on a plane parallel to the conventional plane or working surface of a workpiece, regardless of the orientation of the workpiece.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A push-pull electret transducer, comprising:
   a first electrode;
   a second electrode;
   a non-metalized mono-charged electret diaphragm disposed between the first and second electrodes;
   at least one spring, wherein the at least one spring contacts the electret diaphragm; and
   a supporting frame counterbalance, wherein the supporting frame counterbalance contacts the electret diaphragm and wherein the at least one spring opposes a force applied against the electret diaphragm by the frame counterbalance.

2. The push-pull electret transducer of claim 1, wherein the electret diaphragm is disposed between the supporting frame counterbalance and the at least one spring.

3. The push-pull electret transducer of claim 2, wherein a change in pressure on the supporting frame counterbalance causes the electret diaphragm to move between the first and second electrodes.

4. The push-pull electret transducer of claim 2, wherein movement of the electret diaphragm results in a charge rearrangement on the first and second electrodes.

5. The push-pull electret transducer of claim 1, wherein the mono-charged diaphragm comprises a polymer.

6. The push-pull electret transducer of claim 5, wherein the polymer comprises a fluoropolymer.

7. The push-pull electret transducer of claim 6, wherein the fluoropolymer comprises fluorinated ethylene propylene (FEP).

8. The push-pull electret transducer of claim 6, wherein the fluoropolymer comprises polytetrafluoroethylene (PTFE).

9. The push-pull electret transducer of claim 1, wherein a static position of the electret diaphragm is balanced between the first and second electrodes such that push-pull electret transducer is configured as a microphone.

10. The push-pull electret transducer of claim 1, wherein a variable restoring force supports the mono-charged electret diaphragm between the first and second electrodes.

11. The push-pull electret transducer of claim 10, configured as a microphone.

12. The push-pull electret transducer of claim 11, configured as a microphone for use in water.

13. The push-pull electret transducer of claim 11 having a sensitivity in the range of from about 10 to 100 mV/Pa.

14. The push-pull electret transducer of claim 1, wherein the mono-charged electret diaphragm has an asymmetric static position.

\* \* \* \* \*